United States Patent
Danducci, II et al.

(10) Patent No.: US 12,432,229 B2
(45) Date of Patent: Sep. 30, 2025

(54) DETECTION OF MALICIOUS ENCRYPTION BASED ON MACHINE LEARNING

(71) Applicant: International Business Machines Corporation, Armonk, NY (US)

(72) Inventors: Angelo Danducci, II, Austin, TX (US); Andrew Stephen Cassidy, Austin, TX (US); Jean Elvira Schunck, Travis, TX (US); Harshan Kumar Yennamaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 18/341,841

(22) Filed: Jun. 27, 2023

(65) Prior Publication Data
US 2025/0007925 A1    Jan. 2, 2025

(51) Int. Cl.
*H04L 9/40*    (2022.01)
*G06N 20/00*    (2019.01)

(52) U.S. Cl.
CPC ......... *H04L 63/1416* (2013.01); *G06N 20/00* (2019.01)

(58) Field of Classification Search
CPC ..... H04L 63/1416; H04L 41/16; G06N 20/00; H04N 21/251; H04N 21/466; H04N 21/45; H04N 21/4662; G06F 7/023
See application file for complete search history.

(56) References Cited

U.S. PATENT DOCUMENTS

| | | | |
|---|---|---|---|
| 6,574,727 B1 | 6/2003 | Davidson et al. | |
| 10,089,459 B2 | 10/2018 | Sridhara | |
| 10,133,865 B1* | 11/2018 | Feinman | G06F 21/56 |
| 10,459,849 B1* | 10/2019 | Shorb | G06F 11/3034 |
| 10,503,904 B1 | 12/2019 | Singh et al. | |
| 10,607,009 B2 | 3/2020 | Dahan | |
| 10,880,328 B2 | 12/2020 | Farhady | |
| 10,997,288 B2 | 5/2021 | Cudak | |
| 11,144,638 B1 | 10/2021 | Golden | |
| 11,347,500 B2* | 5/2022 | Krishnamoorthy | G06N 3/08 |
| 11,347,849 B2 | 5/2022 | Hicks | |
| 11,374,946 B2 | 6/2022 | Hewlett, II | |

(Continued)

FOREIGN PATENT DOCUMENTS

IN    202131001289 A    2/2021

OTHER PUBLICATIONS

Fura et al., "Workload Pattern Detection", U.S. Appl. No. 18/341,832, IBM Docket No. P202204457US01, Filed Jun. 27, 2023, 29 pages.

(Continued)

*Primary Examiner* — Michael Won
(74) *Attorney, Agent, or Firm* — Elliot J. Shine

(57) ABSTRACT

A computer-implemented method, computer program product, and computer system to classify executing processes as malicious based on opcode data. A processor to retrieves live opcode data corresponding to one or more processors executing a process. A processor generates a malicious classification of the process based on output from a machine learning model that is provided the live opcode data. A processor, in response to the machine learning model classifying the process as malicious, restricts the execution of the process on the one or more processors.

19 Claims, 6 Drawing Sheets

(56) References Cited

U.S. PATENT DOCUMENTS

| | | | |
|---|---|---|---|
| 11,620,379 B1* | 4/2023 | Hegde | G06F 21/554 |
| | | | 706/23 |
| 2013/0326625 A1 | 12/2013 | Anderson et al. | |
| 2014/0283041 A1* | 9/2014 | Cao | G06F 21/563 |
| | | | 726/22 |
| 2015/0262067 A1* | 9/2015 | Sridhara | H04W 12/128 |
| | | | 706/12 |
| 2016/0173516 A1 | 6/2016 | Raugas et al. | |
| 2016/0275288 A1* | 9/2016 | Sethumadhavan | H04L 9/3239 |
| 2017/0230388 A1* | 8/2017 | Pevny | G06F 21/552 |
| 2018/0007074 A1* | 1/2018 | Kune | G06F 1/28 |
| 2018/0225453 A1* | 8/2018 | Pedersen | G06F 21/564 |
| 2019/0197239 A1* | 6/2019 | Govardhan | G06N 20/00 |
| 2019/0199736 A1 | 6/2019 | Howard et al. | |
| 2019/0272375 A1* | 9/2019 | Chen | G06N 5/045 |
| 2019/0303116 A1* | 10/2019 | Ding | G06F 3/04842 |
| 2019/0340392 A1* | 11/2019 | Khorrami | G06F 21/71 |
| 2020/0364345 A1* | 11/2020 | Hecht | G06F 21/577 |
| 2021/0051162 A1* | 2/2021 | Taylor | G06N 20/00 |
| 2021/0226990 A1* | 7/2021 | Devi | H04L 63/1425 |
| 2021/0328969 A1* | 10/2021 | Gaddam | H04L 63/102 |
| 2022/0116411 A1* | 4/2022 | Melicher | G06F 21/566 |
| 2022/0138319 A1 | 5/2022 | Kim | |
| 2022/0309160 A1 | 9/2022 | Xiao et al. | |
| 2022/0311798 A1 | 9/2022 | Dani et al. | |
| 2022/0353284 A1* | 11/2022 | Vörös | H04L 63/1441 |
| 2023/0046287 A1* | 2/2023 | Bilgrami | G06F 18/24765 |
| 2023/0252136 A1 | 8/2023 | Kim | |
| 2023/0281315 A1 | 9/2023 | Capellman | |
| 2024/0291847 A1* | 8/2024 | Tsarynny | G06F 21/554 |
| 2024/0311479 A1* | 9/2024 | Yan | G06F 21/52 |
| 2024/0362335 A1 | 10/2024 | Biondi et al. | |

OTHER PUBLICATIONS

IBM Appendix P, list of patents and patent applications treated as related, Filed Herewith, 2 pages.

"Ransomware Protection Market Size and Forecast", Verified Market Research, accessed on Feb. 3, 2023, 6 pages, <https://www.verifiedmarketresearch.com/product/ransomware-protection-market/>.

Braue, David, "Global Ransomware Damage Costs Predicted to Exceed $265 Billion By 2031", 2022 Cybersecurity Ventures, 10 pages, <https://cybersecurityventures.com/global-ransomware-damage-costs-predicted-to-reach-250-billion-usd-by-2031/>.

Disclosed Anonymously, "Method of Early Detection and Halting of Ransomware Attacks", IP.com No. IPCOM000268682D, IP.com Electronic Publication Date: Feb. 15, 2022, 5 pages.

Disclosed Anonymously, "System and Method for Reducing False Positives in the Failure Prediction of an Operating System", IP.com No. IPCOM000266634D, IP.com Electronic Publication Date: Aug. 4, 2021, 11 pages.

Faruk et al., "Malware Detection and Prevention using Artificial Intelligence Techniques", 2021 IEEE International Conference on Big Data (Big Data), ResearchGate, Conference Paper—Dec. 2021, 10 pages.

Gulmez et al., "Graph-Based Malware Detection Using Opcode Sequences", 2021 9th International Symposium on Digital Forensics and Security (ISDFS), © 2021 IEEE, 5 pages.

Jeon et al., "Malware-Detection Method with a Convolutional Recurrent Neural Network Using Opcode Sequences", Information Sciences, 2020, © 2020 Published by Elsevier Inc., 19 pages.

Jha et al., "Recurrent Neural Network for Detecting Malware", Computers & Security 99, 2020, © 2020 Elsevier Ltd., 13 pages.

Masum et al., "Ransomware Classification and Detection With Machine Learning Algorithms", ResearchGate, Conference Paper—Jan. 2022, 7 pages.

Niu et al., "Opcode-Level Function Call Graph Based Android Malware Classification Using Deep Learning", Sensors 2020, Published: Jun. 29, 2020, 21 pages.

Patel et al., "Analyzing Hardware Based Malware Detectors", DAC '17, Jun. 18-22, 2017, Austin, TX, USA, © 2017 ACM, 6 pages.

Singh et al., "Ransomware Detection using Process Memory", Proceedings of the 17th International Conference on Information Warfare and Security, 2022, 10 pages.

Wikipedia, "Swiss cheese model", access on Feb. 3, 2023, 3 pages, <https://en.wikipedia.org/wiki/Swiss_cheese_model>.

Zhang, et al., "Classification of Ransomware Families with Machine Learning Based on N-Gram of Opcodes", Future Generation Computer Systems 90, 2019, 11 pages.

Wikipedia, "Logistic regression", Retrieved from: https://web.archive.org/web/20240101081307/https://en.wikipedia.org/wiki/Logistic_regression, Retrieval date, Jan. 1, 2024, 28 pages.

* cited by examiner

DETECTION OF MALICIOUS ENCRYPTION BASED ON MACHINE LEARNING

BACKGROUND OF THE INVENTION

The present invention relates generally to the field of malware detection, and more particularly to detecting malicious encryption and ransomware via machine learning models trained on opcodes.

Malicious software, or malware, has been a constantly evolving field in the computing arts. Recently ransomware has become prevalent and frequently used malware. Ransomware begins encrypting files on a user's hard drive. Then once enough files a locked, the ransomware warns the user of the encrypted files and ransoms the access to the files to the user, typically requesting funds be sent to a cryptocurrency account.

SUMMARY

Embodiment of the present invention are directed towards a computer-implemented method, computer program product, and computer system to classify executing processes as malicious based on opcode data. A processor to retrieves live opcode data corresponding to one or more processors executing a process. A processor generates a malicious classification of the process based on output from a machine learning model that is provided the live opcode data. A processor, in response to the machine learning model classifying the process as malicious, restricts the execution of the process on the one or more processors.

DETAILED DESCRIPTION

Figure 1:
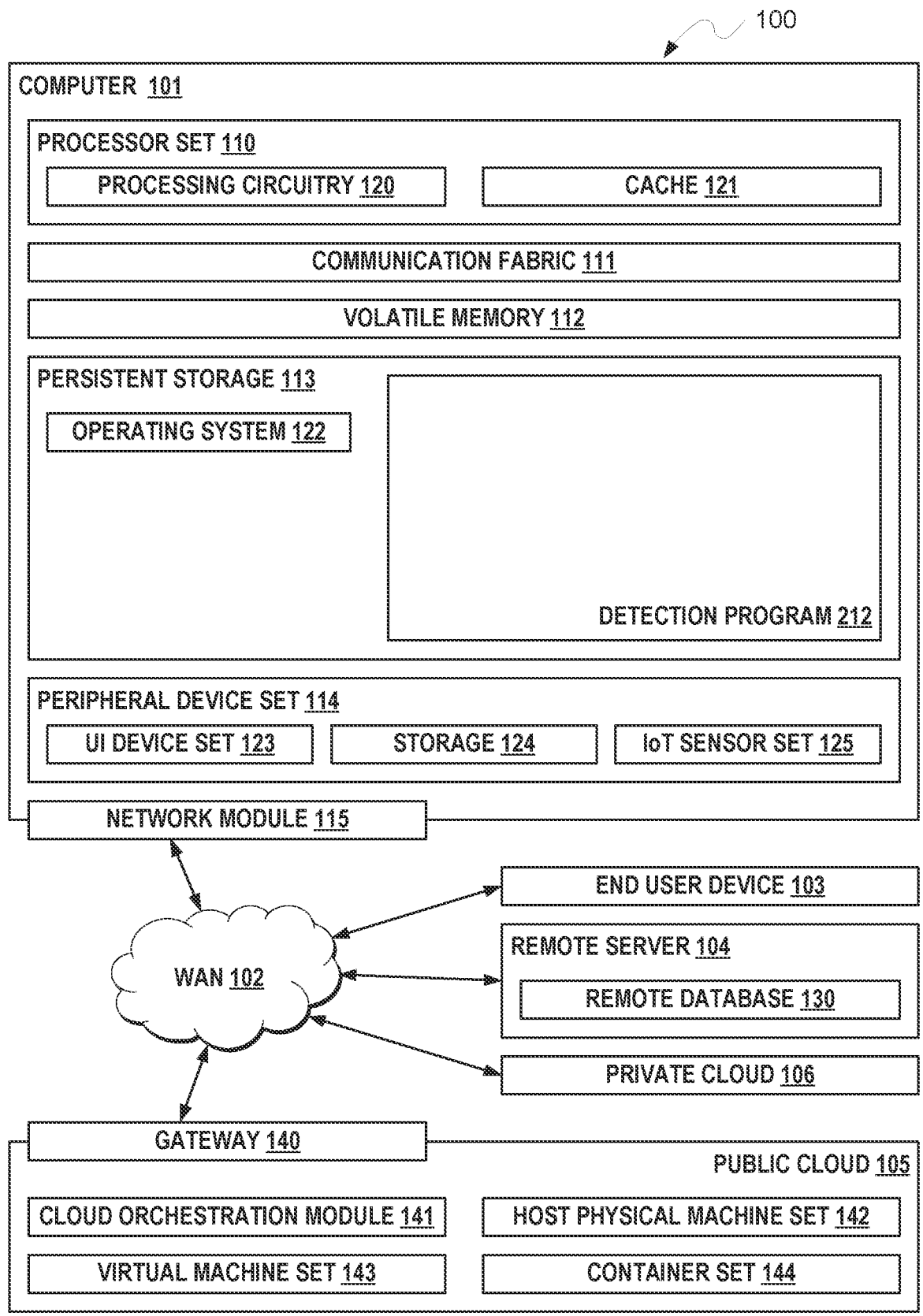
FIG. 1 depicts a block diagram of components of the computing device executing a malware detection program, in accordance with an exemplary embodiment of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as detection program 212, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods (i.e., detection program 212) may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
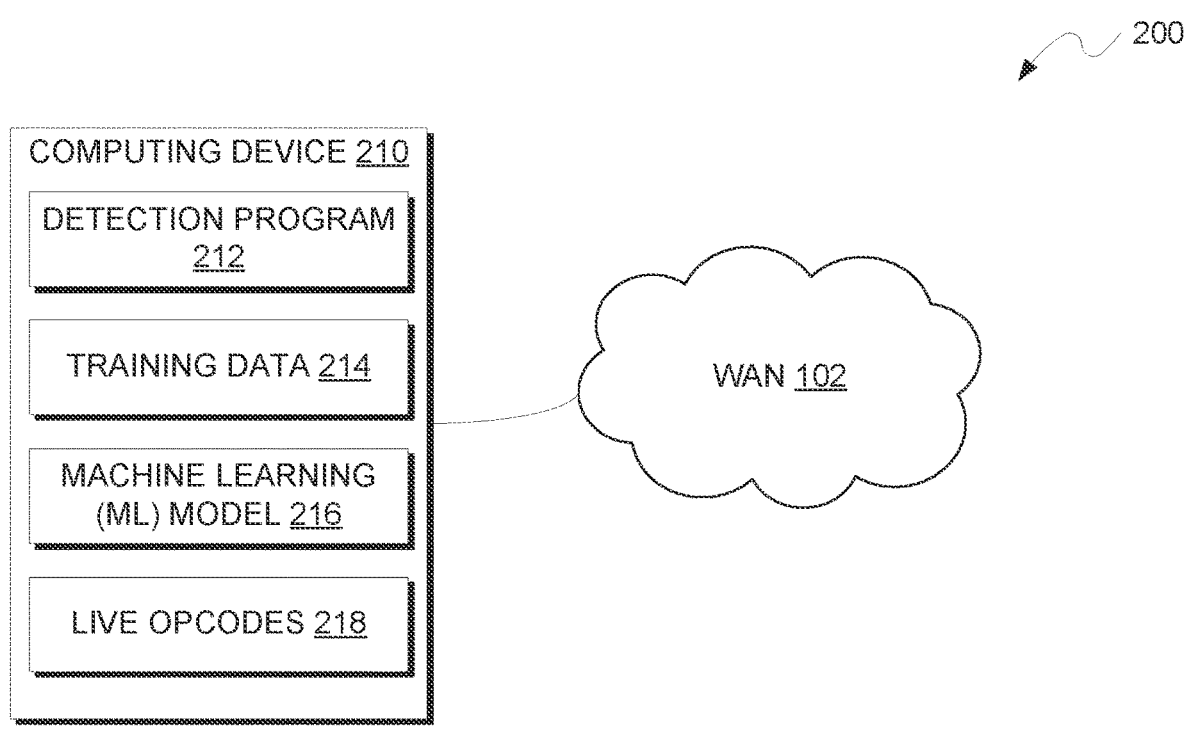
FIG. 2 is a functional block diagram illustrating a computing environment, in accordance with an exemplary embodiment of the present invention.

FIG. 2 is a functional block diagram illustrating computing environment, generally designated 200, in accordance with one embodiment of the present invention. Computing environment 200 includes computing device 210 connected to WAN 102. Computing device 210 includes detection program 212, training data 214, machine learning (ML) model 216 and live opcode data 218. In various embodiments of the present invention, computing device 210 can be a standalone device, a server, a laptop computer, a tablet computer, a netbook computer, a personal computer (PC), or a desktop computer. In another embodiment, computing device 210 represents a computing system utilizing clustered computers and components to act as a single pool of seamless resources.

In various embodiments, detection program 212 monitors and evaluates various processes executing on computing device 210 for performing encryption-type operations that may indicate malicious intent, such as ransomware. As discussed herein, computing device 210 can be any computing device, such as a PC or mobile device, or collection of computing devices, such as a group of clustered computers. For simplicity and clarity, the following will be described from the perspective of a single computing device. However, one of ordinary skill in the art will appreciate that embodiments and features of the invention can be modified and applied to multiple devices executing processes as well, such as in a distributed computing or cloud system.

In various embodiments, detection program 210 employs machine learning (ML) model 216 to classify live opcode data 218 regarding opcodes or instructions executed by various processes running on computing device 210. Opcodes are the instructions sent to a processor for execution so that a process or program can perform the various operations and calculations needed to be functional. A basic opcode example would be the "add" which adds two values, called operands, using hardware and logic of the processor to produce the result, called a resultant (i.e., add a,b; where "add a,b" is the instruction issued by the process, a and b are operands, and the opcode is "add", with the processor returning the resultant to the process). While the following embodiments are discussed only using opcodes, or the type of instructions used by processes, one of ordinary skill in the art will appreciate that the entire instruction, including operands and the resultant, may be used in both training and detection by ML model 216 without deviating from the invention.

In various embodiments, detection program 212 trains ML model 216 based on training data 214. Training data 214 includes two pre-classified training sets, malicious encryption opcode sets and non-malicious encryption opcode sets. Malicious encryption opcodes are collected from instructions executed from known malicious programs and processes that use encryption. For example, ransomware is a malicious process that encrypts user's files and then attempt to ransom access back to the user by eliciting payment. Instructions from these types of programs are classified as malicious encryption and included in the malicious encryption opcode training set of training data 214. Non-malicious encryption opcodes are collected from processes that perform encryption but are not malicious in design, unlike ransomware. For example, opcodes from a virtual private network (VPN) client are gathered as training data for the non-malicious encryption opcode training set, as VPNs typically encrypt internet traffic prior to being sent.

In various embodiments, both training sets in training data 214 train the ML model 216 based on the various sequences of instructions found in both sets. Based on the sequence patterns among the opcodes of the different sets, ML model 216 is trained to identify similar sequences in live opcode data 218 when deployed, thereby classifying operating processes as either malicious or non-malicious. In some training sets, opcodes from non-malicious and non-encrypting processes are retrieved and used for training. As such, ML model 216 would also be trained to classify other processes without encryption as non-malicious.

Figure 3:
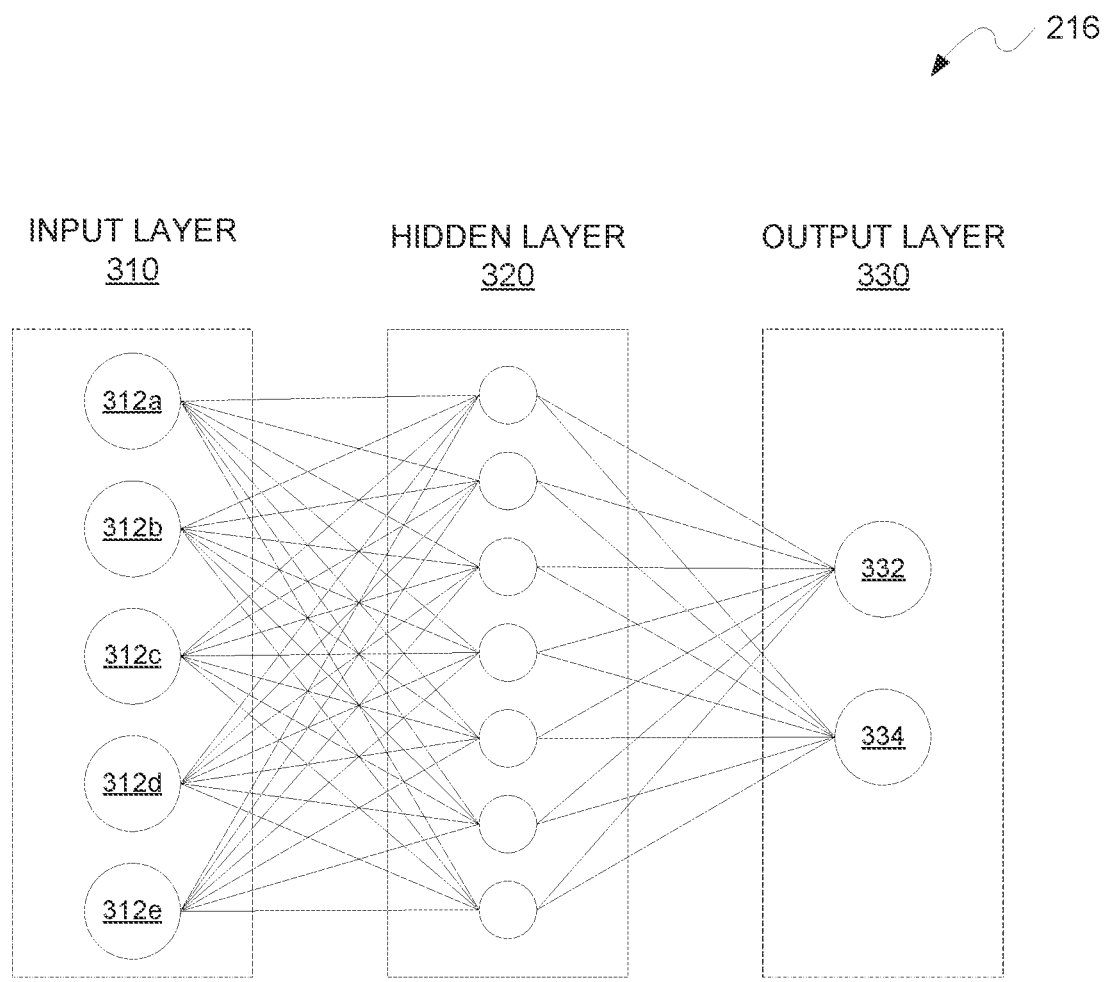
FIG. 3 depicts a machine learning model for classifying the maliciousness of sequential opcode data.

In various embodiments, ML model 216 is a neural network model, such as the example classifier model 300 of FIG. 3. ML model 216 includes three layers, input layer 310, hidden layer 320 and outer layer 330. Input layers includes opcode sequence 312a-c. The output layer 330 produces a classification based on the data supplied to input layer 310 (i.e., opcode sequence 312a-c). Based on training data 214 and the classification of said data, hidden layer 320 is generated such that most opcode sequences are correctly classified as indicated by the training data. During training, detection program 212 supplies a given opcode sequence to the input layer along with forcing the output layer, or the classification, to be same as indicated by training data 214. As such, for opcode sequences indicated as containing malicious encryption, the classification output layer 330 is set to "malicious" or equivalent label to indicate the training data include op code from malicious encryption algorithms. The input layer 310 is set to a sequence of instructions gathered from the training data 214 that was captured from an application or program running which is known to be executing malicious encryption algorithms.

As depicted in FIG. 3, a sequence of five opcodes is selected for training and evaluation of ML model 216. One of ordinary skill in the art will recognize that any number of sequential opcodes may be selected for training and detection of malicious encryption by ML model 216 without deviating from the invention. For various permutations, detection program 212 selects various groupings of five sequential opcodes from training data 214. Detection program 212 sets the output layer 330 classification to "malicious" 332 while supplying various permutations of sequential opcodes to ML model 216. During this training, the hidden layer 320 of ML model 216 is altered to produce consistent classification of the "malicious" 332 opcode sequences. Additionally, ML model 216 is trained with sequential opcodes from application with encryption, but are not malicious, labeled as "non-malicious" 334. A similar number of opcodes from the training data 214 is supplied to ML model 216 while keeping the classification as "non-malicious" 334. Once ML model 216 is trained and produces consistent classification of the opcode sequences, the ML model 216 is trained and ready to be deployed.

Returning to FIG. 2, in various embodiments, detection program 212 retrieves opcodes for currently executing processes on computing device 210, which are represented as live opcodes 218. While the following is discussed in relation to detection program 212 executing within and monitoring processes of computing device 210, as discussed herein, detection program 212 may be executed on another device separate from the device producing live opcodes 218. For example, computing device 210 may be executed within a distributed cloud computing platform with live opcodes 218 being retrieved by the various logical and virtual devices constituting the distributed cloud computing platform.

In various embodiments, live opcodes 218 includes recent opcodes attributed to various processes executing on computing device 210, or other devices or processes monitored by computing device 210. As opcodes are retrieved from executing processors or devices being monitored, detection program 212 updates live opcodes 218 along with information attributing the opcodes to a process, such as a process identification number, and/or a device, such as a machine access control (MAC) address or an Internet Protocol (IP) address.

In various embodiments, detection program 212 selects opcode sequences from live opcodes 218. For each selected sequence, ML model 216 produces a classification, that the opcode sequence is indicative of malicious encryption or not. If ML model 216 classifies the opcode sequence as indicative of malicious encryption, then detection program 212 begins restricting access or resources of the attributed process, or otherwise halting or terminating the attributed process. If ML model 216 does not produce a malicious encryption classifier, detection program 212 continues monitoring any ongoing processes. In some scenarios, detection program 212 reevaluates each process as a new opcode is retrieved and stored in live opcodes 218. In other scenarios, detection program 212 may reevaluate after a predetermined number of opcodes for a process are retrieved (e.g., re-evaluates every five opcodes). Given a process does not produce a malicious encryption classifier via ML model 216, detection program 212 will permit normal access rights and elevation of the process. Once detection program 212 receives a malicious encryption classifier via ML model 216 for a process, detection program 212 will quarantine, restrict or otherwise halt the process.

In some embodiments, the output layer 330 of ML model 216 includes more than the "malicious encryption" classification. During training, various output layer 330 classifications are trained to account for different types of "malicious encryption" such as but not limited to, ransomware, crypto-mining, crypto-jacking, or other types of cryptovirology. In such scenarios, training data 214 is configured to include opcodes with labels for each type of cryptovirology to be detected (e.g., opcodes from a ransomware program are provided along with a "ransomware" classifier to train hidden layer 320 of ML model 216.

In some embodiments, functions and features of detection program 212 may be implemented as hardware logic in tandem with a processor. In such a scenario, ML model 216 is trained on another device and deployed directly on hardware of computing device 210. The hardware would have quick and direct access to opcode streams of various processors or cores, along with processes and threads executing thereon, of computing device 210. For example, a module using fully programmable gate-array (FPGA) logic could be designed with ML model 216 deployed within the FPGA. In such scenarios, embodiments of the present invention can quickly detect malicious encryption processes, preventing them from completing and causing damage to files of computing device 210. One of ordinary skill in the art skill in the art will appreciate that various hardware implementations of detection program 212 may be used without deviating from the invention such as, but not limited to, hardware accelerators, secondary caches, or additional logic such as an FPGA or secondary processor.

In some embodiments, detection program 212 retrieves and analyzes live opcodes 218 from a processor of processor set 110. In other embodiments, detection program 212 separates and analyzes live opcodes 218 from each core of each processor in processor set 110. In further embodiments, if a core has a thread or other process indicate that a thread or process on executing on the core has malicious encryption, then detection program 212 may stop, quarantine, or restrict the thread; as well as other instances of the thread and any other processes executing on other cores that originated from the same program or process ID as the offending thread.

In some embodiments, ML model 216 is trained with, in addition to live opcodes 218, memory addresses and or file paths referred to in the live opcodes 218. With most ransomware, the malicious programs typically crawl the filesystem of a user, encrypting and ransoming files, in a sequential or predetermined sequence. For example, the ransomware process may start encrypting user-space files that people would find important, such as a picture or download folder. As such, training ML model 216 with memory addresses or file paths referred to by a process can further increase accuracy of the ML model 216.

Figure 4:
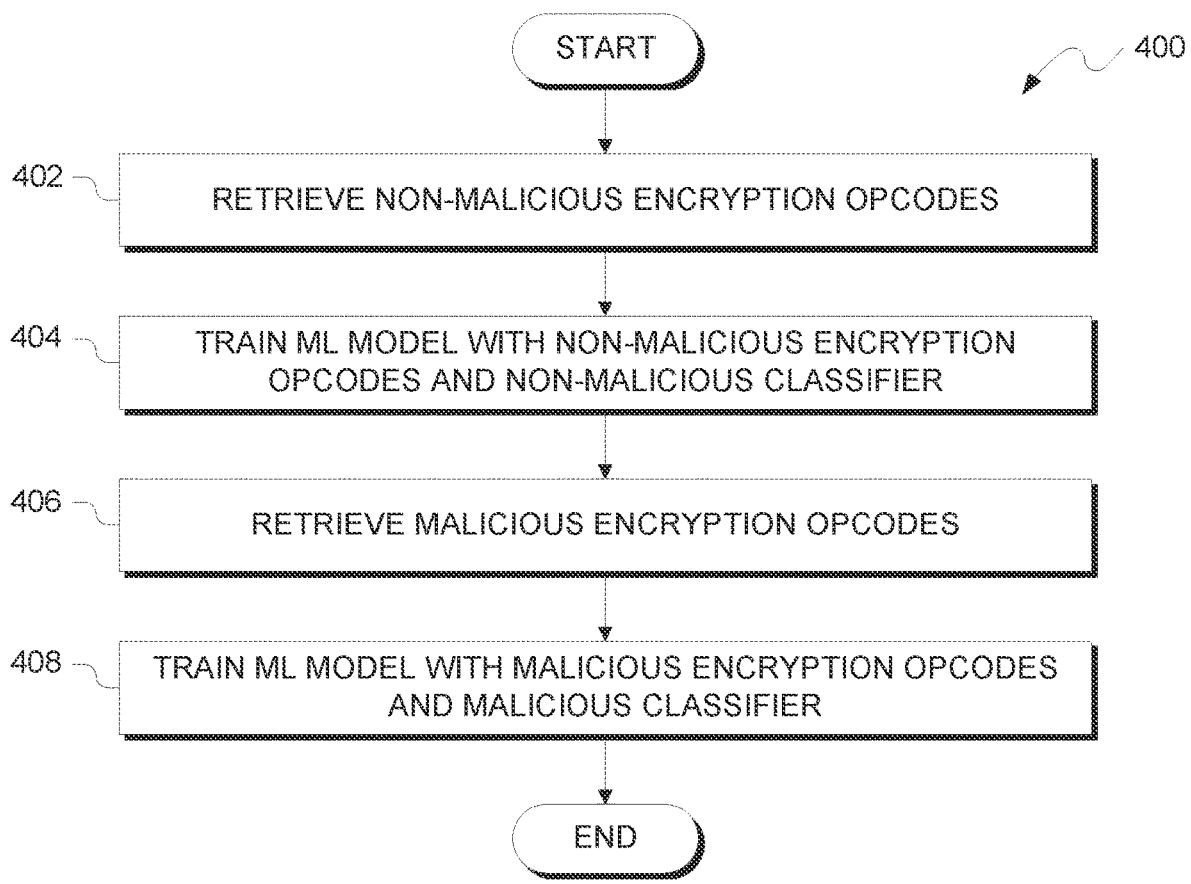
FIG. 4 illustrates operational processes of training a machine learning model for classifying the maliciousness of sequential opcode data, on a computing device within the environment of FIG. 1, in accordance with an exemplary embodiment of the present invention.

FIG. 4 illustrates operational processes, generally designated 400, of training machine learning (ML) model 216 for classifying the maliciousness of sequential opcode data. In process 402, detection program 212 retrieves non-malicious encryption opcodes. Training data 214 includes opcode sequences captured from non-malicious processes and are classified accordingly. In some scenarios, training data 214 includes opcodes from non-malicious and non-encrypting processes and are trained in the classification ML model 216 as non-malicious along with opcodes for non-malicious encryption algorithms. By doing so, the trained ML model 216 will classify non-malicious processes that perform encryption or not, while still classifying processes that indicate malicious encryption.

In process 404, detection program 212 trains the ML model 216 with various permutations of opcode sequences from training data 214. In some scenarios, detection program 212 randomly selects a sequence of opcodes of a predetermined size (e.g., five sequential opcodes are selected from all opcodes) and supplies the sequence to input layer 310 of ML model 216. Additionally, the classification in output layer 330 is set to "non-malicious". After providing various sequences to input layer 310, hidden layer 320 is trained and configured to correctly classify non-malicious process via opcode sequences (i.e., live opcodes 218).

In process 406, detection program 212 retrieves malicious encryption opcodes. Training data 214 includes opcode sequences captured from malicious processes that employ some sort of encryption, such as ransomware, and are classified accordingly for training ML model 216. In process 408, detection program 212 trains ML model 216 with the opcodes from malicious processes that employ some sort of encryption. Detection program 212 supplies various permutations of opcode sequences to the input layer 310 of ML model 216 while keeping the output layer 330 set to "malicious". For each training permutation, hidden layer 320 of ML model 216 is altered to produce more consistent or accurate predictions. Once ML model 216 can predict a proper classification within some error rate, confidence interval or similar measure, ML model 216 is trained on training data 214 to determine when opcode sequences are indicative of malicious encryption activity.

Figure 5:
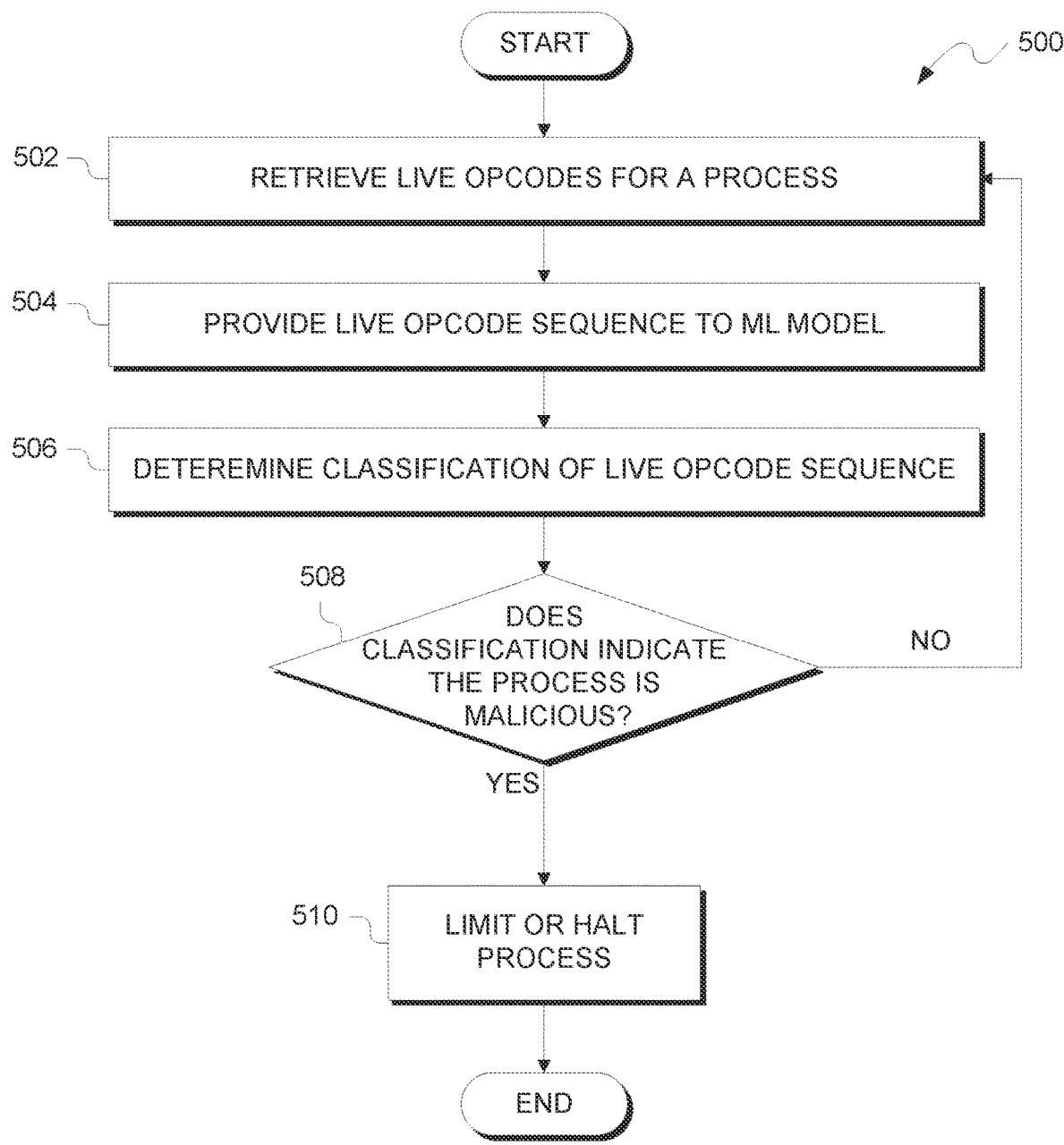
FIG. 5 illustrates operational processes of classifying the maliciousness of sequential opcode data, on a computing device within the environment of FIG. 1, in accordance with an exemplary embodiment of the present invention.

FIG. 5 illustrates operational processes, generally designated 500, of detection program 212 classifying the maliciousness of sequential opcode data. In process 502, detection program 212 retrieves live opcodes 218 from processes executing on computing device 210. In some scenarios, detection program 212 may be observing processors and computing devices not associated with computing device 210, such as in a distributed cloud computing platform. In process 504, detection program 212 provides the incoming live opcode sequence to ML model 216 as the associated process executes instructions. In some embodiments detection program 212 monitors only opcodes and detection program 212 does not separate different processes (i.e., detection program 212 monitors all opcodes executing on a processor and the various cores thereon), detection program 212 may aggregate or combine instructions across all cores and threads currently executing.

In process 506, detection program 212 determines a classification of the incoming live opcodes 218 of currently executing processes. As stated herein, detection program 212 provides ML model 216 the most recent opcode sequence up to a predetermined number of opcodes (e.g., the last five op codes executed by the process) (process 504). ML model 216, based on the training discussed in regard to FIG. 4, produces a classification of the opcode sequence that the opcode sequence is indicative of malicious encryption, with the label "malicious", or non-malicious encryption or otherwise opcodes not indicative of encryption, malicious or not, with the label "non-malicious".

In decision process 508, if the classification is "malicious" (YES branch), then detection program 212 limits, halts or otherwise restricts the process from executing (process 210). If the classification is "non-malicious" (NO Branch of decision process 508), then detection program 212 continues retrieving the latest opcodes (process 502) and reevaluates the updated sequence with ML model 216 (process 506) to see if the classification changes (decision process 508).

Figure 6:
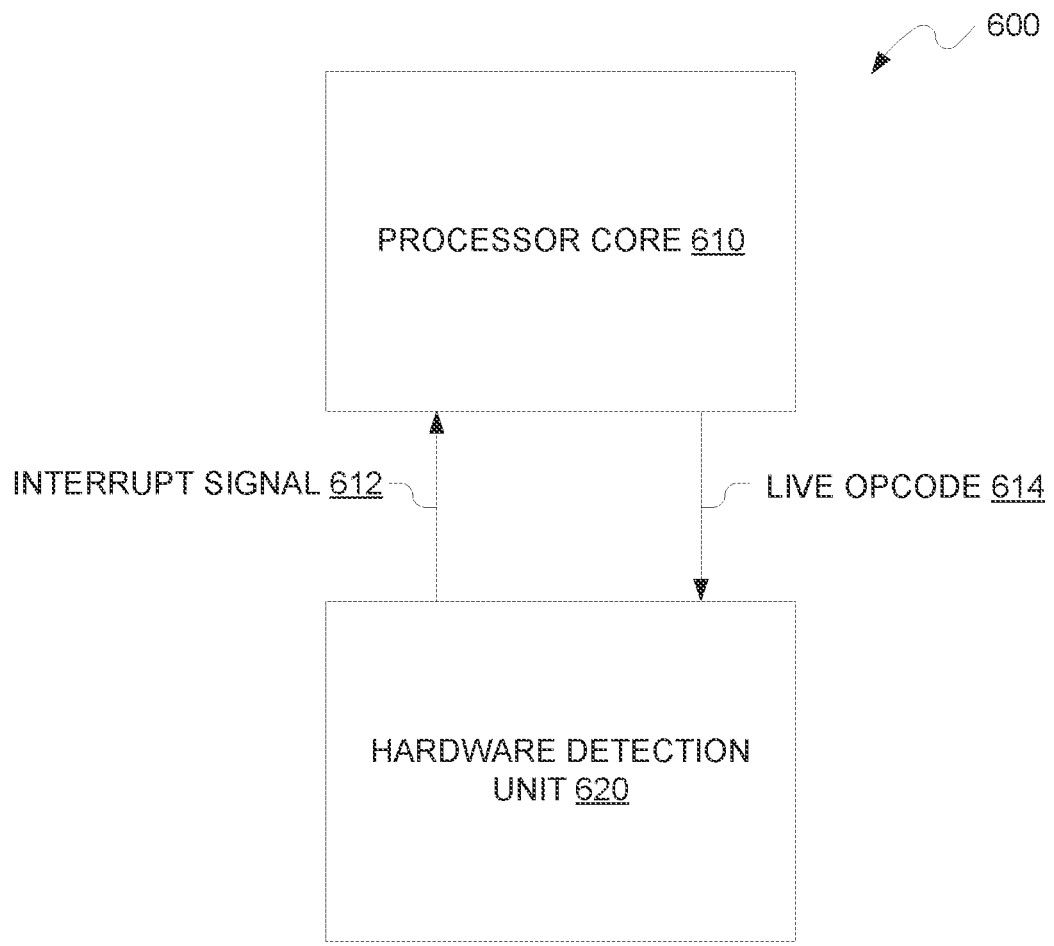
FIG. 6 depicts a hardware implementation of the processes of a detection program for classifying the maliciousness of sequential opcode data.

FIG. 6 depicts a hardware implementation 600 of the processes of detection program 212 for classifying the maliciousness of sequential opcode data. As stated herein, some embodiments of the present invention are directed towards hardware or device based implementations. Hardware implementation 600 depicts an arrangement of hardware detection unit 620 inspecting opcodes of processor core 610. As processor core 610 receives instructions for execution from various processes, live opcode 614 is sent via a data bus or interconnect that transmits the opcode to hardware detection unit 620.

In various embodiments, live opcode 614 is an output directly connected to the instruction memory of processor core 610. As a process sends an instruction to be executed by processor core 610, the instruction is stored in a small memory bank of instruction memory. In such arrangement, live opcode 614 is a direct interconnect with the instruction memory of processor core 610. As such, hardware detection unit 620 is provided real time instructions sent for execution by processor core 610 via the live opcode 614 interconnect. By connecting hardware detection unit 620 directly to a processor, such as processor core 610, malicious processes can be detected quicker than software methods where instruction data needs to be retrieved and written to system memory, causing delays in overhead of reading and writing data at such a high frequency as the clock rate of the processor's cores.

In various embodiments, hardware detection unit 620 includes various hardware logic to implement the various processes discussed herein regarding detection program 212. For example, hardware detection unit 620 may be an application-specific integrated circuit (ASIC) designed to implement the various processes of detection program 212 discussed herein, as well as classification of opcodes by ML model 216. One of ordinary skill in the art will recognize that a variety of hardware implementations and designs for hardware detection unit 620 may be utilized without deviating from the present invention. In various embodiments, hardware detection unit 620 may be designed as including one or more of the following to perform the various processes of detection program 212 discussed herein such as, but not limited to, a hardware accelerator (e.g., ASIC), a cache, a secondary processor, or a programmable logic circuit (e.g., an FPGA).

In various embodiments, hardware detection unit 620 stores an incoming stream of live opcode 614 until an opcode sequence length for a process is captured. Once enough initial instructions are executed, hardware detection unit 620 inspects the stored sequence of opcodes. As a new live opcode 614 is received from processor core 610, hardware detection unit 620 pushes the new opcode onto the sequence, replacing the oldest instruction in the sequence. As processor core is executing and providing opcodes, hardware detection unit 620 evaluates the sequence with a hardware implementation of ML model 216. If the sequence of opcodes is classified a malicious, then hardware detection unit 620 sends a interrupt signal 612 to processor core 610. In turn, processor core 610 will stop, halt, or otherwise restrict execution or access of currently executing processes. If a process ID is provided in live opcode 614, then processor core 610 may be configured to restrict or halt only the offending process, as discussed herein. By directly connecting hardware detection unit 620 to processor core 610, interrupt signal 612 can be raised faster than software implementations that typically need to wait for opcodes to be written to system memory, as well as raise a software interrupt. Since hardware detection unit 620 is provided opcodes directly from an interconnect to instruction memory for processor core 610 and interrupt signal 612 being directly connected to processor core 610, hardware implementation of the present invention can identify and quarantine suspect processes quicker than software solutions, thereby increasing detection and suppression of malicious processes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:
training a machine learning model on a plurality of opcode sequences selected from malicious and non-malicious encryption processes, wherein the machine learning model is a neural network model including at least a hidden layer and an outer layer, and wherein, during training, the hidden layer is altered to produce consistent classification of the plurality of opcode sequences and the outer layer is trained for a plurality of different types of malicious encryption;

retrieving live opcode data corresponding to one or more processors executing a process;

generating a malicious classification of the process based on output from the machine learning model that is provided the live opcode data; and in response to the machine learning model classifying the process as malicious, restricting the execution of the process on the one or more processors, wherein the restricting of the execution of the process includes restricting a thread on a core of a first processor and further restricting the thread on any other cores of the one or more processors originating from a same program or process ID of the malicious process.

2. The computer-implemented method of claim 1, wherein input to the machine learning model is a sequence of opcodes from the live opcode data, and wherein the input further includes memory addresses used in the live opcode data.

3. The computer-implemented method of claim 1, wherein the machine learning model is implemented in hardware as one or more of the following: a hardware accelerator, a cache, a secondary processor, or a programmable logic circuit.

4. The computer-implemented method of claim 3, wherein the hardware implementation of the machine learning model is connected to an instruction memory of the one or more processors.

5. The computer-implemented method of claim 3, wherein the hardware implementation of the machine learning model sends an interrupt signal to the one or more processors executing the process classified as malicious by the machine learning model.

6. The computer-implemented method of claim 5, wherein the interrupt signal is sent from a hardware detection unit to a processor core, wherein the hardware detection unit and the processor core are directly connected.

7. The computer-implemented method of claim 6, wherein the process ID is provided in the live opcode data retrieved, and wherein the processor core is configured to restrict only the process classified as malicious.

8. A computer program product comprising:
one or more computer-readable storage media and program instructions stored on the one or more computer-readable storage media, the program instructions comprising:

program instructions to train a machine learning model on a plurality of opcode sequences selected from malicious and non-malicious encryption processes, wherein the machine learning model is a neural network model including at least a hidden layer and an outer layer, and wherein, during training, the hidden layer is altered to produce consistent classification of the plurality of opcode sequences and the outer layer is trained for a plurality of different types of malicious encryption;

program instructions to retrieve live opcode data corresponding to one or more processors executing a process;

program instructions to generate a malicious classification of the process based on output from the machine learning model that is provided the live opcode data; and program instructions, in response to the machine learning model classifying the process as malicious, to restrict the execution of the process on the one or more processors, wherein the restricting of the execution of the process includes restricting a thread on a core of a first processor and further restricting the thread on any other cores of the one or more processors originating from a same program or process ID of the malicious process.

9. The computer program product of claim 8, wherein input to the machine learning model is a sequence of opcodes from the live opcode data, and wherein the input further includes memory addresses used in the live opcode data.

10. The computer program product of claim 8, wherein the machine learning model is implemented in hardware as one or more of the following: a hardware accelerator, a cache, a secondary processor, or a programmable logic circuit.

11. The computer program product of claim 10, wherein the hardware implementation of the machine learning model is connected to an instruction memory of the one or more processors.

12. The computer program product of claim 10, wherein the hardware implementation of the machine learning model sends an interrupt signal to the one or more processors executing the process classified as malicious by the machine learning model.

13. The computer program product of claim 12, wherein the interrupt signal is sent from a hardware detection unit to a processor core, wherein the hardware detection unit and the processor core are directly connected, wherein the process ID is provided in the live opcode data retrieved, and wherein the processor core is configured to restrict only the process classified as malicious.

14. A computer system comprising:
one or more computer processors;
one or more computer readable storage media; and
program instructions stored on the computer readable storage media for execution by at least one of the one or more processors, the program instructions comprising:

program instructions to train a machine learning model on a plurality of opcode sequences selected from malicious and non-malicious encryption processes, wherein the machine learning model is a neural network model including at least a hidden layer and an outer layer, and wherein, during training, the hidden layer is altered to produce consistent classification of the plurality of opcode sequences and the outer layer is trained for a plurality of different types of malicious encryption;

program instructions to retrieve live opcode data corresponding to one or more processors executing a process;

program instructions to generate a malicious classification of the process based on output from the machine learning model that is provided the live opcode data; and program instructions, in response to the machine learning model classifying the process as malicious, to restrict the execution of the process on the one or more processors, wherein the restricting of the execution of the process includes restricting a thread on a core of a first processor and further restricting the thread on any other cores of the one or more processors originating from a same program or process ID of the malicious process.

15. The computer system of claim 14, wherein input to the machine learning model is a sequence of opcodes from the live opcode data, and wherein the input further includes memory addresses used in the live opcode data.

16. The computer system of claim 14, wherein the machine learning model is implemented in hardware as one or more of the following: a hardware accelerator, a cache, a secondary processor, or a programmable logic circuit.

17. The computer system of claim 16, wherein the hardware implementation of the machine learning model is connected to an instruction memory of the one or more processors.

18. The computer system of claim 16, wherein the hardware implementation of the machine learning model sends an interrupt signal to the one or more processors executing the process classified as malicious by the machine learning model.

19. The computer system of claim 18, wherein the interrupt signal is sent from a hardware detection unit to a processor core, wherein the hardware detection unit and the processor core are directly connected, wherein the process ID is provided in the live opcode data retrieved, and wherein the processor core is configured to restrict only the process classified as malicious.

\* \* \* \* \*